Patented Oct. 29, 1946

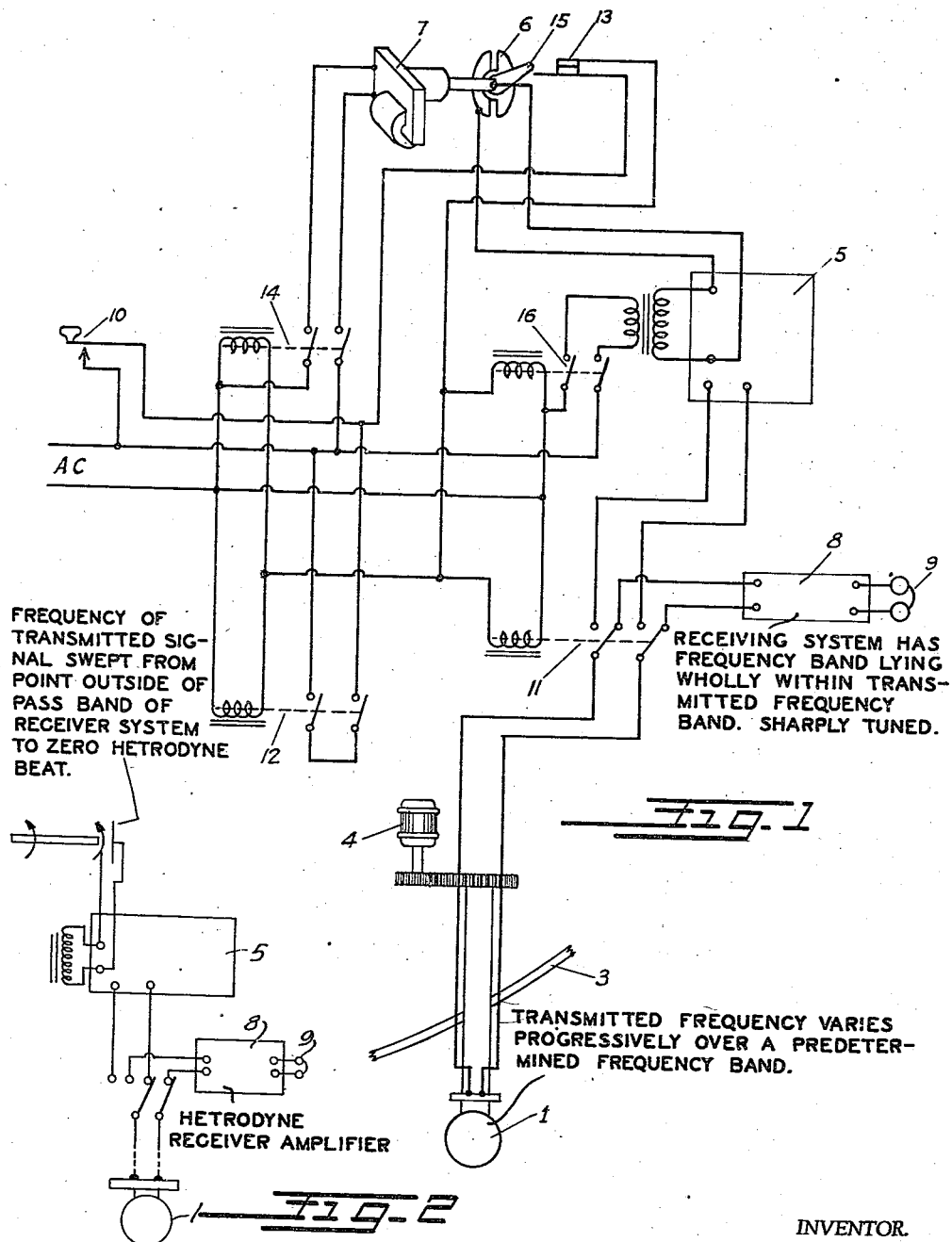

2,410,067

UNITED STATES PATENT OFFICE 2,410,067

SUBMARINE SIGNALING

Bertram M. Harrison, Newton Highlands, Mass., assignor, by mesne assignments, to Submarine Signal Company, Boston, Mass., a corporation of Delaware Application September 23, 1938, Serial No. 231,390

6 Claims. (Cl. 177—386)

The present invention relates to a method and apparatus for sound ranging, that is for the determination of the presence and location of objects in water.

In general in practicing sound ranging a projector capable of emitting a beam of compressional waves in water in substantially a horizontal direction is used to detect the presence of objects in the water and to determine their distance from the projector by the echo method, that is by determining the time required for the compressional waves to travel to the reflecting object and return to the receiver. Heretofore signals of various lengths but of constant frequency have been used.

In my copending application Serial No. 174,081, filed November 11, 1937, however, it was pointed out that such constant frequency signals are not always desirable. The propagating medium, namely the water, is bounded by definite top and bottom surfaces which, being irregular, may cause reflections if any part of the transmitted beam happens to strike them. Moreover, reflections may also be caused by the non-homogeneous character of the water medium. Such miscellaneous reflections, when heard in the receiver, have the character of reverberations which may completely obscure the reflection or echo from the object which is being observed. Consequently these multiple reflections or reverberations greatly reduce the possible distances over which sound ranging may be practiced. As pointed out in my above-mentioned application, the effect of the reverberations may be substantially reduced by providing a continuous frequency modulation of the transmitted signal.

According to the present invention the effect of the multiple echoes or reverberations is substantially entirely eliminated by providing that the frequency modulation of the transmitted signal extend over a definite frequency band and further that the receiving system be sharply tuned and have a band pass which is somewhat smaller than the frequency band of the transmitted signal. Moreover, I have found that the frequency band of the receiving system should lie wholly within the frequency band of the transmitted signal so that the latter will begin outside of the range of the receiving system, sweep through the operating band of the receiver and terminate outside the band on the other side of the band from which it started.

It will be understood, of course, that it is immaterial whether the frequency of the emitted signal is made to increase or to decrease. However, to assist in identifying the successive echoes it is highly desirable that each transmitted signal be an exact duplicate of every other signal. This means that the initial and final frequencies of all signals must be the same.

A schematic arrangement of the apparatus and circuits whereby the invention may be carried out is shown in Fig. 1 of the drawing and in Fig. 2 a modification of a detail of the same.

A projector 1 suitable for the emission of compressional waves in water, preferably of supersonic frequency, may be mounted outside of the skin 3 of the ship so that its direction of transmission may be controlled by means of the motor 4. The device 1 may, if desired, also be used for receiving, as shown, or a separate receiver may be employed. The projector is energized by an electric frequency generating source 5 which provides a suitable alternating current. The frequency of the source is caused to vary through a predetermined frequency band by means of a variable condenser 6 driven by the motor 7 when the latter is energized. The received reflected signals may be made audible by a receiver amplifier 8 and the telephones 9 or, if desired, visual indications may be produced by apparatus known in the art.

The operation of the system is controlled by a key 10 through a series of relays. A transfer relay 11 connects the projector 1 to the amplifier 8 except when the relay coil is energized, in which case the projector 1 is connected to the source 5. The source 5 is in turn energized by the power control relay 10. The relay 14 energizes the motor 7; while the relay 12 is an interlocking relay whose contacts are in parallel with the key 10 and whose operating coil is in series with the contact 13. The motor 7 drives the movable plates of the condenser 6 and simultaneously therewith the lever 15 which at the end of its stroke opens contacts 13. Upon the opening of these contacts all the relays become deenergized. It will be noted, therefore, that the length of each transmitted signal is the same regardless of the length of time the key 10 may be depressed.

Thus, the closing of the key 10 causes the simultaneous closing of all the relays whereupon the projector 1 emits a signal continuously varying in frequency and having a definite time length as determined by the opening of contacts 13. As soon as the transmission of the signal is completed and the contacts 13 open, the relay 11 resumes its initial position in which the projector 1 is connected to the amplifier 8, whereupon the receiving system is in condition for the receipt of echoes.

As previously discussed, the entire receiving system, which comprises the receiving device 1 and the amplifier 8 together with any filters it may contain, has a frequency pass band of relatively sharp cutoffs and of a width which is slightly narrower than the band of frequencies in the emitted signal. Moreover, the limits of the pass band of the receiving system lie wholly within the frequency band of the transmitted signal.

By means of the present invention substantially no sound is heard in the listening device 9 except that caused by the echo from a reflecting object lying directly within the path of the beam of waves transmitted by the projector. It will be understood that for the purposes of the present invention any suitable means of progressively varying the frequency of the transmitted signal may be used in place of that shown in the drawing.

Where a heterodyne receiver amplifier is used, it is not necessary to sweep the frequency of the transmitted signal entirely through the pass band of the receiver, but it is sufficient, and often more convenient, to sweep the frequency of the transmitted signal from a point outside of the pass band of the receiver to the frequency corresponding to zero beat or vice versa. For instance, the transmitted signal may progressively sweep from 25,000 cycles to 23,000 cycles during the signal period and the receiving system may be tuned with a band pass ranging from 24,000 cycles to 22,000 cycles with the heterodyning frequency set at 23,000 cycles. In this case zero beat will be reached when the signal frequency is 23,000 cycles. This eliminates reverberations as heard in the listening device as completely as though the signal frequency were swept completely through the receiver pass band.

It has been found that a rate of change of frequency of the transmitted signal of 2000 cycles per second or higher is usually satisfactory.

It should be noted that, in the present system, of necessity both projector and receiver including receiving circuits are for practical reasons highly tuned and that as a result impact excitation either in the projector or in any part of the receiving system may cause ringing at the natural frequency of the system and add to the difficulties of faithful reproduction or receipt of the echo or reflected signal. By means of the present invention this difficulty is avoided and the signal in the receiver will gradually build up and not cause shock excitation of it.

Having now described my invention, I claim:

1. The method of sound ranging in water with the use of a high frequency beam projector and a high frequency receiving system which comprises transmitting a beam of supersonic compressional waves continuously varying in frequency between predetermined frequency limits, the said limits including the sensitive frequency band of the receiving system and observing the reflections from objects in the path of the emitted signal.

2. In a system for sound ranging, in combination, a projector adapted to project a beam of supersonic waves, an electric frequency generating source connected therewith for operating the same and means for operating the source to cause the projected beam of compressional waves continuously to vary in frequency over a predetermined band of frequencies, a receiving system adapted to receive the reflected compressional waves, said receiving system being sharply tuned and adapted to pass only a band of frequencies entirely comprehended within the frequency band of the transmitted signal.

3. In a system for sound ranging, means for projecting a beam of supersonic compressional waves in the form of a signal of a predetermined time length and continuously varying in frequency between predetermined frequency limits and means for receiving reflected waves, said means being responsive only to a frequency band entirely contained within the frequency limits of the transmitted waves.

4. In a sound ranging system, in combination, a tuned projector, a tuned receiving system having a band pass frequency characteristic, and means for supplying current to said projector to transmit a signal of continuously varying frequency having definite frequency limits lying outside the frequency band of the receiving system.

5. In a sound ranging system, means for transmitting compressional waves, a receiving system for said waves having a band pass frequency characteristic and including a heterodyne circuit, and means for actuating said transmitter to transmit a signal of continuously varying frequency between two frequency limits, one limit lying outside the frequency band of the receiving system and the other limit at the frequency corresponding to zero beat in said heterodyne.

6. The method of sound ranging in water with the use of a high frequency beam projector and a high frequency receiving system which comprises transmitting a beam of supersonic compressional waves continuously varying in frequency between predetermined frequency limits, the said limits overlapping at least at one end the sensitive frequuncey band of the receiving system and observing the reflections from objects in the path of the emitted signal.

BERTRAM M. HARRISON.